United States Patent [19]
Maltby

[11] Patent Number: 6,088,394
[45] Date of Patent: Jul. 11, 2000

[54] EFFICIENT INTERFRAME CODING METHOD AND APPARATUS UTILIZING SELECTIVE SUB-FRAME DIFFERENCING

[75] Inventor: John Maltby, Havant, United Kingdom

[73] Assignee: International Business Machines Corporation, Armonk, N.Y.

[21] Appl. No.: 08/930,422

[22] PCT Filed: Aug. 2, 1995

[86] PCT No.: PCT/GB95/01828

§ 371 Date: Sep. 22, 1997

§ 102(e) Date: Sep. 22, 1997

[87] PCT Pub. No.: WO96/29680

PCT Pub. Date: Sep. 26, 1996

[30] Foreign Application Priority Data

Mar. 21, 1995 [GB] United Kingdom .................. 9505646

[51] Int. Cl.[7] .......................... H04N 7/12; H04N 11/02; H04N 11/04
[52] U.S. Cl. ......................... 375/240; 348/409; 348/415
[58] Field of Search ................................. 348/409, 415, 348/700, 701, 420, 421, 26; H04N 7/12, 11/02, 11/04

[56] References Cited

U.S. PATENT DOCUMENTS

| | | | |
|---|---|---|---|
| 4,716,404 | 12/1987 | Tabata et al. | 345/434 |
| 4,717,957 | 1/1988 | Santamaki | 348/415 |
| 5,353,061 | 10/1994 | Rodriguez | 348/409 |
| 5,408,542 | 4/1995 | Callahan | 382/244 |
| 5,485,212 | 1/1996 | Frederick | 348/415 |
| 5,506,624 | 4/1996 | Moreton | 348/420 |
| 5,654,772 | 8/1997 | Mester | 348/700 |
| 5,732,157 | 3/1998 | Osawa | 382/244 |

FOREIGN PATENT DOCUMENTS

| | | | |
|---|---|---|---|
| 0 566 185 A1 | 4/1993 | France | H04N 7/13 |
| 0 261 917 A2 | 3/1988 | Japan | H04N 5/14 |
| 0 368 460 A1 | 9/1989 | Japan | H04N 1/415 |
| WO 86/03922 | 7/1986 | WIPO | H04N 7/12 |

*Primary Examiner*—Howard Britton
*Assistant Examiner*—Nhon T. Diep
*Attorney, Agent, or Firm*—Ronald L. Drumheller

[57] ABSTRACT

A system and method for processing digital images are presented. Prior art systems and methods compare all corresponding pixel locations as between two images before transmitting the difference therebetween to receiving apparatus. A significant factor in the length of time taken to compare two digital images and transmit to a receiving terminal the difference therebetween is the number of pixels which have to be compared or processed. As between successive images many pixels remain constant and any changes are generally localised. The invention performs a comparison between a first and second image to determine the location of the localised areas. Thereafter, successive images are compared only at the locations within or neighbouring the localised areas. Therefore, a significant reduction in the number of pixels to be compared can be realised by focusing processing efforts on such localised areas thereby resulting in an increase in processing speed.

11 Claims, 7 Drawing Sheets

EFFICIENT INTERFRAME CODING METHOD AND APPARATUS UTILIZING SELECTIVE SUB-FRAME DIFFERENCING

The present invention relates to a system and method for processing digital images.

In order to store or transmit a sequence of digital images efficiently it is desirable to compress the sequence so that the amount of data constituting the compressed sequence is less than that of the original sequence and to be able to recover the original sequence from the compressed sequence.

Compression can be utilised in, for example, video conferencing systems, video telephones or collaborative working systems. The users of such systems communicate both aurally and visually. The ability to see the other party imparts a more natural and interactive quality to the communication and allows the parties to more confidently evaluate their counter-part. In such systems large amounts of data have to be exchanged to update the images of the parties. Further, a sequence of compressed digital images requires less bandwidth to transmit as compared to a sequence of complete digital images.

Digital image compression also finds application in storing image data on mass storage media, such CD-ROMS or magnetic storage media, to reduce the amount of storage required to record a sequence of digital images.

Contiguous images generated, by image capture apparatus, such as a video camera, during a video conference or derived from a mass storage media are often substantially similar and vary only by small amounts. Accordingly, attempts have been made to use this property to reduce the amount of data which needs to be exchanged to support a video conference or processed to record a sequence of digital images. The reduction is achieved by exchanging or storing, for example, only selective areas of the digital images or eliminating the areas which are, as between contiguous images, constant.

U.S. Pat. No. 4,958,378 discloses a system and method which provides for the updating of a digital image according to differences between successive digital images. During a process of storing data in memory, the data currently stored in the memory is read and compared to data to be written into the same location. If the data is not the same, the discrepancy and location of the same is noted in a separate area of memory to be used for subsequent analysis. By utilising information gathered on the changed pixels, a video display need only update the changed data thereby reducing the amount of data to be manipulated. U.S. Pat. No. 4,958,378 compares all corresponding pixels as between successive images and only updates the preceding image when differences are identified therebetween.

WO 86/03922 discloses a video compression system and method which compares successive images to detect areas that have changed. A reference memory is used such that whenever an area of an image is detected to have changed, a determination is made to determine whether or not the changed picture area corresponds to information stored in a respective location of the reference memory; if the determination is positive, the transmitter outputs a code word instructing the receiver to retrieve image data from its respective reference memory; otherwise the changed picture area is transmitted to the receiver.

EP 0 303 322 A1 discloses a system for transmitting and/or storing data in a digitised form. Successive images, stored in respective memories, are compared and when difference between corresponding locations are identified, the image data of one memory is transmitted to a receiver and also used to update the image stored in the other memory.

One of the factors which determines the speed with which images can be updated is the number of pixels which have to be compared to effect an update.

Accordingly the present invention provides a method for processing a sequence of digital images comprising a current image and a subsequent image, said method comprising the steps of storing a list of locations, comparing the current digital image and the subsequent digital image at locations stored in said list to identify any locations which correspond to differences between said current image and said subsequent images, outputting the locations of any such differences and corresponding values to update said current image, updating said list in response to the locations identified in said step of comparing.

The speed of processing of the current image and subsequent images or contiguous images is greatly increased due to the significantly reduced number of pixels considered during the comparison. It will be appreciated that picture quality is sacrificed in favour of speed and that the method is lossy.

A further embodiment provides a method wherein said step of updating comprises, removing from the list locations for which differences between the current image and subsequent image were not identified.

Removing the redundant locations from the list ensures that the locations having identical values are not considered in future comparison effected between successive images and helps minimise the size of the list.

During a comparison between successive images, the images may also differ for locations which are not contained within the list.

Accordingly a further embodiment provides a method, further comprising the steps of, selecting neighbouring locations to the locations contained within the list, and adding said neighbouring locations to the list.

Preferably, an embodiment provides a method, wherein neighbouring locations are selected only for those locations identified in said step of comparing.

The use of neighbouring locations is efficient at following movement across the image.

Using the same neighbouring location pattern to determine the neighbouring locations may result in certain updates being continually missed.

Accordingly, an embodiment provides a method, wherein the step of selecting neighbouring locations comprises selecting a different pattern of neighbouring locations for different successive images.

Using multiple neighbouring location patterns avoid certain updates being continually missed.

In certain instances differences between successive images can result which are not sufficient proximate to a location currently under consideration to be identified during a comparison of neighbouring locations.

Accordingly, a further embodiment provides a method, further comprising the step of adding selectable locations substantially uniformly distributed over said current and subsequent images to said list.

Adding distributed locations to the list advantageously enables differences remote from the current locations stored in the list to be detected and considered during subsequent comparisons.

Constantly commencing the coarse scan at the same location may result in updates remaining undetected.

Accordingly, an embodiment provides a method, wherein the position of said selectable locations are determined relative to a variable starting location.

As the number of locations stored within the list increases, the rate of growth thereof also increases.

Accordingly, an embodiment provides a method, wherein the number of said selectable locations varies according to the number of locations stored in the list.

Restricting the number of locations added to the list avoids overloading the list.

Storing both the current image and a subsequent image during the processing thereof can make significant storage demands on the memory resources of a system used to implement an embodiment.

Accordingly, a further embodiment provides a method, wherein said list further comprises for each location stored therein a respective value representing the value of the location of said current image, and wherein the step of comparing compares said respective values with values at corresponding locations of said subsequent image to identify any differences therebetween.

By storing respective values and locations of previously discerned differences, the current image can be discarded thereby realising a significant reduction in the amount of memory required to realise an embodiment.

Simply comparing pixel values as between successive images may result in locations being added to the list for which the differences between pixels in the current image and subsequent image are almost negligible.

Accordingly, an embodiment provides a method, wherein the step of comparing uses a threshold value such that any differences less than said threshold value are ignored.

A still further embodiment provides a method, wherein the threshold value is variable according to the number of locations in the list.

Varying the threshold value advantageously increases the control exercisable over the number of locations stored in the list.

The present invention also provides a system for processing a sequence of digital images comprising a current image and a subsequent image, said system comprising
 means for storing a list of locations,
 means for comparing the current digital image and the subsequent digital image at locations stored in said list to identify any locations which correspond to differences between said current image and said subsequent images,
 means for outputting the locations of any such differences and corresponding values to update said current image,
 means for updating said list in response to the locations identified in said comparing means.

Embodiments of the present invention will now be described, by way of example only, with reference to the accompanying drawings in which.

Figure 1:
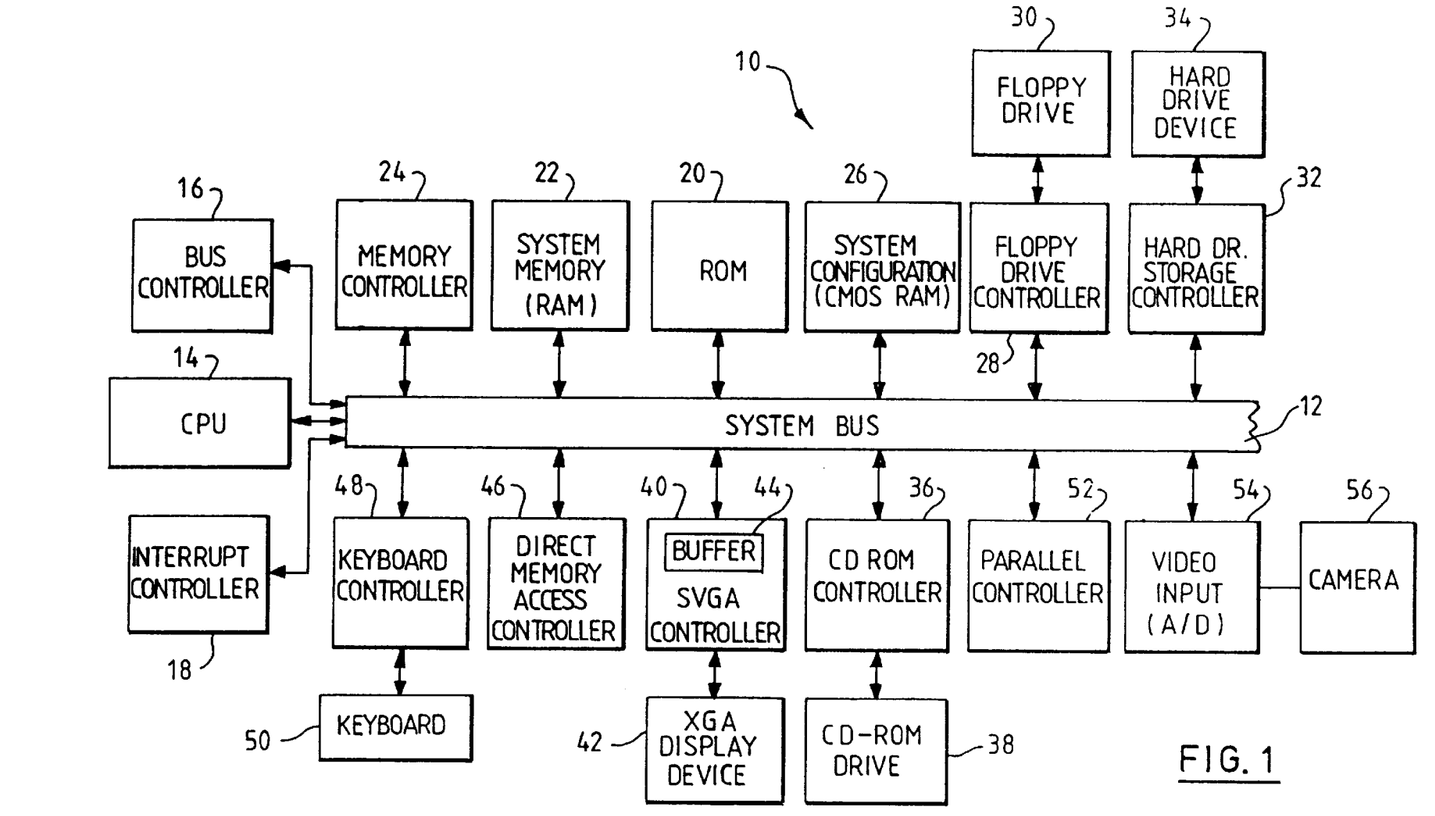
FIG. 1 is a high level block diagram of a data processing system utilised to realise embodiments.

Referring to FIG. 1, there is depicted a block diagram of a personal computer system 10, such as an IBM PS/2 personal computer. The computer system 10 includes a system bus 12. Connected to the system bus 12 is a central processing unit (CPU) 14, for example an Intel 80486 or equivalent microprocessor. The CPU 14 passes data to and receives data from other devices attached to or using the system bus 12. Traffic on the bus is controlled by a bus controller 16. An interrupt controller 18 handles interrupts passed between the CPU 14 and the remaining devices.

Read only memory (ROM) 20 is non-volatile memory storing power on test processes and a basic input/output system (BIOS or ROM-BIOS). The system memory 22 is random access memory into which an operating system, such as the IBM OS/2 operating system, programs and data can be loaded for execution or manipulation. Additional hardware components of the computer 10 include a memory controller 24 and a system configuration store 26, provided by random access memory (RAM).

Auxiliary data storage is provided by peripheral controllers and associated storage devices including, a floppy disk or diskette controller 28 and drive 30, a hard drive controller 32 and hard drive device 34, and a compact disk (CD) read only memory (ROM) controller 36 with CD-ROM drive 38. Digital images, compressed as described herein, may be supplied to computer system 10 from compressed video data stored on portable media mounted in CD-ROM drive 38 or received over a communication network (not shown). After decompression by the CPU 14, visual reproduction of the images can be carried out using a suitable graphics array, such as an SVGA controller 40 and suitable display 42. The SVGA controller 40 includes a RAM buffer 44 in which the current frame for display is stored. In some computers, the buffer 44 may be loaded directly from system memory 22 or from an auxiliary storage controller. In system 10, the CPU 14 handles loading of decompressed data for each new frame to the appropriate locations in buffer 44 for updating the frame.

Direct memory access (DMA) controller 46 handles data transfers between auxiliary storage devices or other input/output devices, and system memory 22 without interaction by CPU 14. Keyboard controller 48 provides an interface to a keyboard 50, for user entries, and may be used to provide an interface to a "mouse". Parallel controller 52 is a device controller for an input or output device (e.g. a printer connected to computer 10 by a parallel cable).

Digital images may be derived from a number of sources, including graphics generated by an application program executing on CPU 14 or from a camera 56 and an associated video interface 54 as used in video conferencing or collaborative working systems. The interface 54 converts an analogue video signal, such as NTSC or PAL, into a digital video signal. The digital signal comprises a series of frames or images each being an array of bytes conveying intensity or colour information (e.g. RGB values) for respective pixels. The frames are arranged in a time ordered sequence. Digital video signals supplied by video input interface 54 are processed by CPU 14 to produce a compressed video signal comprising an initial frame and subsequent frame difference information for storage on a hard drive device 34 or other processing such as being transmitted to a remote terminal of a video conferencing or collaborative working system. The speed with which such compression can be effected is dependent upon the number of data units which have to be compared in order to produce the compressed data.

The above decribed computer hardware is well known in the art and one skilled in the art would readliy appreciate that variations therefrom can also be used without detracting from the invention.

Figure 2:
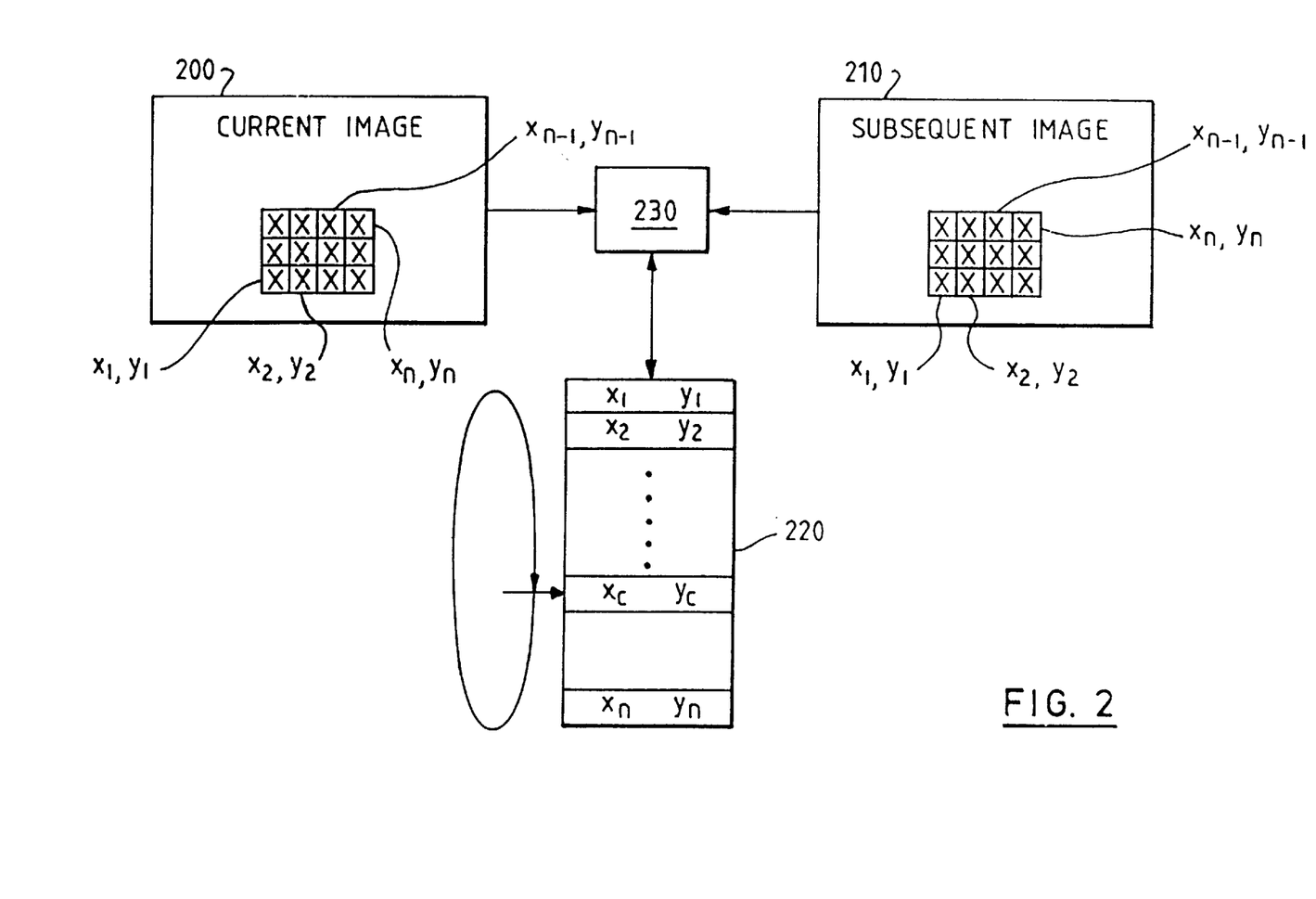
FIG. 2 illustrates schematically the operation of an embodiment.

FIG. 2 illustrates schematically the operation of an embodiment. Pixels of a current image 200 are compared, using a comparator 230, with pixels of a subsequently received image 210 only at pixel locations $(x_1, y_1), \ldots, (x_c, y_c), \ldots, (x_n, y_n)$ identified within a list 220. The current location, $(x_c, y_c)$, identified in the list determines which corresponding pixels of the current 200 and subsequent 210 images are compared. Corresponding pixels for all locations identified in the list are compared. When a difference between corresponding pixels is identified the value of the pixel in the subsequent image together with the location thereof is output for further processing. The further processing typically includes updating the current image with that value and transmitting the location and value to a remote terminal. If no such difference exists for the location currently under consideration, the list is updated to remove that location and processing of the remaining locations continues. A single pass through all locations identified in the list is made for the current image 200 and the subsequent 210 image.

The list is a fixed size array. The array contains an offset from the beginning of an image of each location stored therein. When a storage position of the array is not being used the location details are set to NULL values. Similarly, when a location is removed from the list the location details are set to NULL values. When a location is added to the list a search is made from a suitable starting location in the array, such as the beginning thereof, for a storage position having NULL values. When such a storage position is found it is used to hold the newly acquired location details. The size of the array is such that the number of locations it can hold is approximately one quarter of the number of pixels constituting an image. However, the array can be otherwise dimensioned according to memory or processing requirements. Other suitable lists, such as a linked list, can be used to store the location details. Further, an embodiment may use DRAM or the like to store the locations i.e. the list is replaced by suitable memory.

Upon receiving a subsequent image 210, the comparator 230 compares corresponding pixels of the current 200 and subsequent 210 images at respective locations $(x_1, y_1)$, the first location identified in the list. If a difference between compared pixels in the current and subsequent images is identified, the location $(x_1, y_1)$, remains in the list and the location of the difference and value of the pixel at that location in the subsequent image are output for further processing. The location $(x_1, y_1)$, in the current image is also updated using the pixel value of the subsequent image at the corresponding location. If a difference between compared pixels is not identified, the list 220 is updated to remove the location $(x_1, y_1)$, therefrom and a comparison at the location $(x_1, y_1)$, will not be effected as between the current image and the next subsequent image.

The comparator 230 then compares the corresponding pixels of the current 200 and subsequent 210 images at locations $(x_2, y_2)$. Again, if a difference, exists, the location $(x_2, y_2)$ remains in the list, the location and pixel value at that location in the subsequent image are output for further processing and also used to update the current image. If a difference therebetween does not exist, the location $(x_2, y_2)$ is removed from the list 220.

The above is repeated until pixels of the current image 200 and the subsequent images 210 have been compared only at locations determined by the list 220. After all locations identified in the list have been so compared the list 220 contains only locations for which differences between the current image 200 and subsequent image 210 were identified. By considering only those locations identified in the list the number of pixels which are compared is dramatically reduced as compared to a comparison effected between all pixels of successive images and the comparison between the images is faster. It will be appreciated that the increase in speed of processing is in exchange for a sacrifice in image quality.

Although the above embodiment outputs any identified pixel values and corresponding locations as they are identified, an embodiment can be realised in which any such values and corresponding locations are output for further processing only after all locations within the list have been considered. Further, if during a pass through the list the output buffer becomes full, the contents of the output buffer are output for further processing or if the acquisition of new locations causes the list to become full, the contents of the output buffer are output for further processing.

The above comparison and maintenance of the list is repeated for each subsequent image in the sequence of digital images. A newly received subsequent image replaces the old subsequent image.

At a remote terminal the first complete image is received and the subsequently received locations and corresponding values are used to update the complete image.

Figure 3:
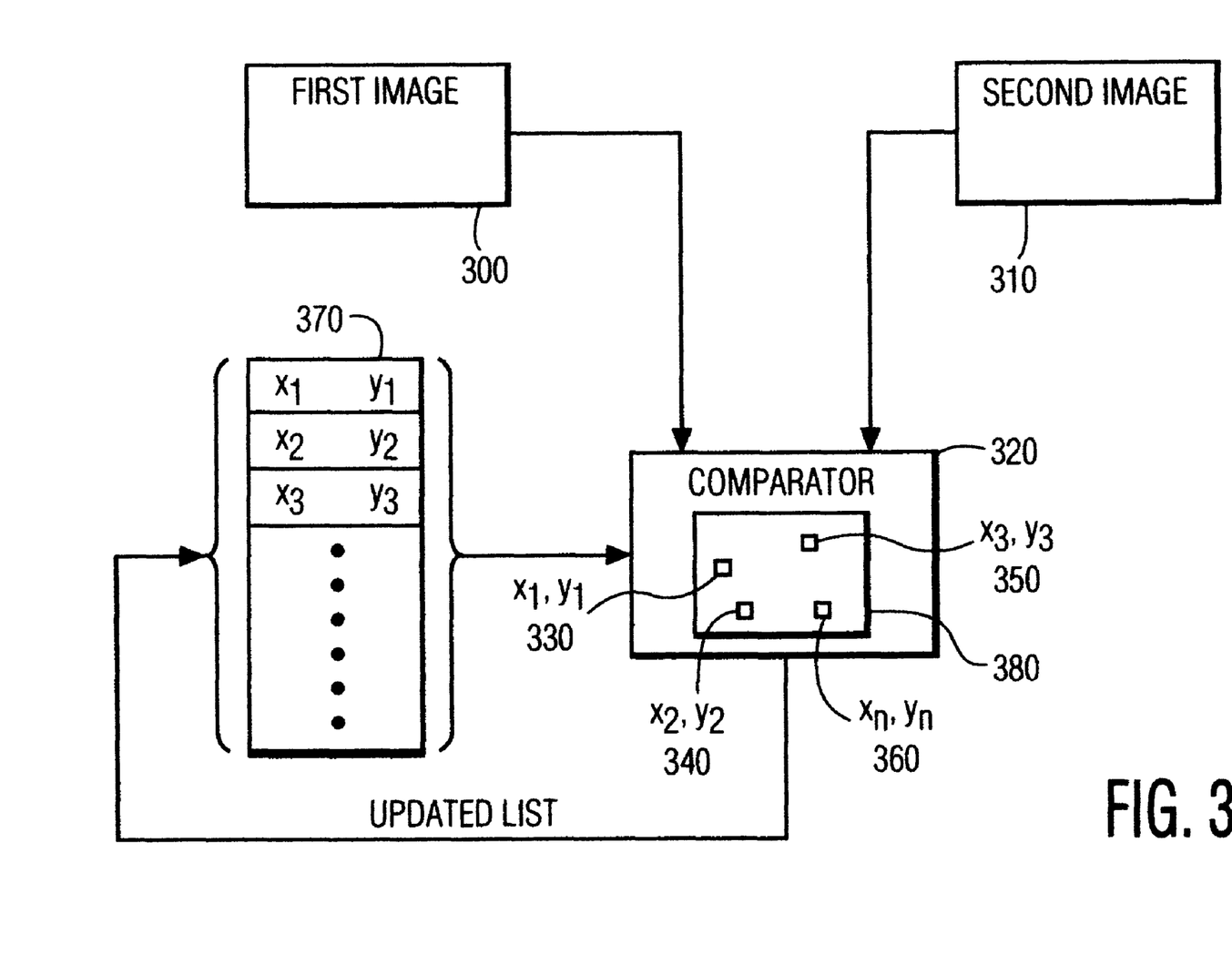
FIG. 3 illustrates the derivation of the locations of differences between a first image and a second image.

FIG. 3 illustrates initialisation of the list used for processing successive digital images. First 300 and second 310 images are compared using a comparator 320 to identify the locations 330 to 360 of any differences therebetween. The co-ordinates of any such locations are stored in the list 370. The initial differences can be identified in many ways. Corresponding pixels of the first 300 and second 310 images are individually compared to identify the locations of any differences; any such locations are stored in the list 370.

In a prefered alternative a coarse comparison (as described in more detail below) is made between the first and second images and the locations of any difference in the coarse comparison are stored in the list and act as seed locations from which the locations for subsequent comparison can evolve.

The first and second images need not necessarily be the first and second images in absolute terms. It may be desirable to periodically output a complete new image for further processing. The newly output complete image would become the current image or "first" image and the second or subsequent image would be so designated relative to the "first" image. Periodically transmitting the complete image results in a slower embodiment but affords some protection against transmission errors.

The location of a value within an image is be determined using a single number which represents the offset of that value relative to the first pixel of the image. If the number of bytes required to represent an offset is less than the number of bytes required to represent a pair of Cartesian co-ordinates, then, from the perspective of memory utilisation, the offset representation is preferred and vice versa. Still further, the offset may be measured relative to the last location output for further processing rather than relative to the first pixel of the image. Using such a relative offset has the advantage of further reducing the number of bytes required to identify the location of any particular value.

Rather than outputting the absolute value of a pixel in the subsequent image, a value derived therefrom can be output i.e. the difference between compared pixels can be output.

Pixels other than those identified within the list may also vary as between the current image and a subsequent image. Hence, in general a comparison between the current image and a subsequent image is effected for not only those locations for which differences have previously been identified but also neighbouring locations. The comparison is effected between the current image and a subsequent image, by the comparator, at locations, $(x_1, y_1), \ldots, (x_n, y_n)$, identified in the list and neighbouring locations, $(x'_1, y'_1), \ldots, (x'_m, y'_m)$. The neighbouring locations, $(x'_1, y'_1), \ldots, (x'_m, y'_m)$, are derived from the locations already identified in the list and can be appended to or included in list. The comparison is effected in substantially the same manner as the other embodiments described herein. For the locations under consideration, the locations of any differences between corresponding pixels of the current image and a subsequent image are identified. If such an identified location is already part of the list, it will remain so. Locations for which no differences are identified are removed from the list. Locations neighbouring locations for which differences were identified are added to the list.

An improvement in processing speed can be realised if care is exercised when adding neighbouring locations to the list to ensure that each neighbouring location is included in the list only once. This can be achieved when adding the neighbouring locations to the list by searching through it to avoid any duplicate locations. A complete search of the list is made to determine whether or not a location proposed to be added to the list is already contained within the list.

The efficacy may be improved if the locations and neighbouring locations are sorted according to a key. For example, the locations can be sorted using the ordinate as a primary sort key and the abscissa as a secondary sort key or, if offsets are used, according to the magnitude of the offset.

A still further alternative would be to utilise a hashing algorithm in which each location in an image is subjected to a hashing algorithm and accorded a specific location in the data structure.

The proximity of the neighbouring locations to the locations identified in the list can be made to vary. For example, an embodiment can be realised in which only immediately adjacent neighbouring locations to the locations in the list are also processed. Alternatively, the neighbouring locations may include those neighbouring locations next but one, or next but N. where N is a positive integer, to locations contained within the list. For example, the locations at the extremities of the neighbouring region may all be within, for example, five pixels of a location contained within the list.

Figure 4:
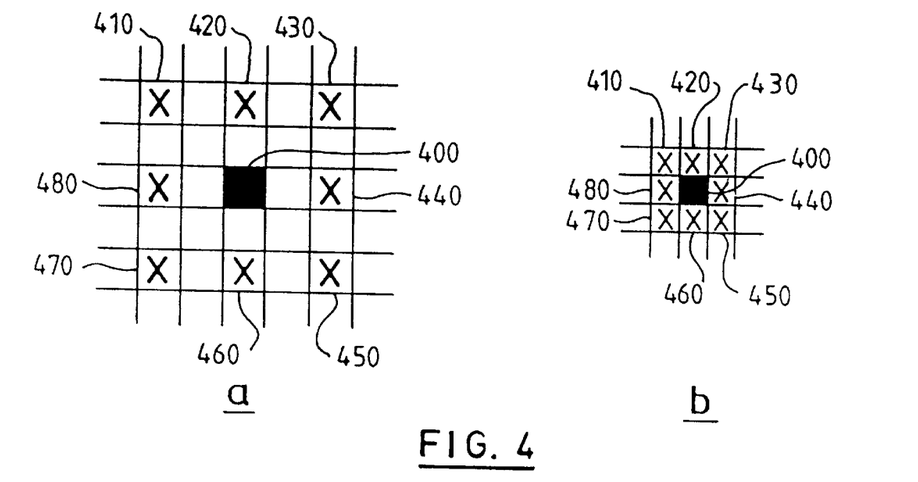
FIGS. 4a and 4b illustrate neighbouring location templates.

Referring to FIG. 4a, there is shown a location 400 and selected neighbouring locations 410 to 480. The selected neighbouring locations are displaced from the location 400 under consideration by two pixels or a step size of two. The number of neighbouring locations 410 to 480 considered for each particular location 400 in the list remains fixed, viz. eight in the instant case. The distribution of the selected neighbouring locations 410 to 480 relative to a location 400 need not be regular as shown in FIGS. 4a and 4b; the distribution can alteratively be irregular. It can be seen from FIG. 4b that alternative step sizes can be used to vary the neighbouring location considered. FIG. 4b depicts a step size of one relative to location 400.

During processing of a sequence of digital images the step size can be made to vary. For example, the step size can be made to toggle between one and two thereby varying the neighbouring locations compared (i.e. alternating between FIGS. 4a and 4b). Alternatively, a series of neighbouring location templates can be determined and can be stepped through according to a predetermined sequence or some criteria.

The number of neighbouring locations may be varied depending on the number of locations contained within the list or the percentage utilisation of the list. For example, if the maximum number of locations which can be stored in the list is reached, then consideration of neighbouring locations can be temporarily suspended. Alternatively, if, for example, the number of locations contained within the list reaches half of the maximum number of locations capable of being stored, a neighbouring location template comprising less neighbours locations can be utilised for subsequent comparisons thereby reducing the possible rate of growth of the number of locations contained within the list.

Figure 5:
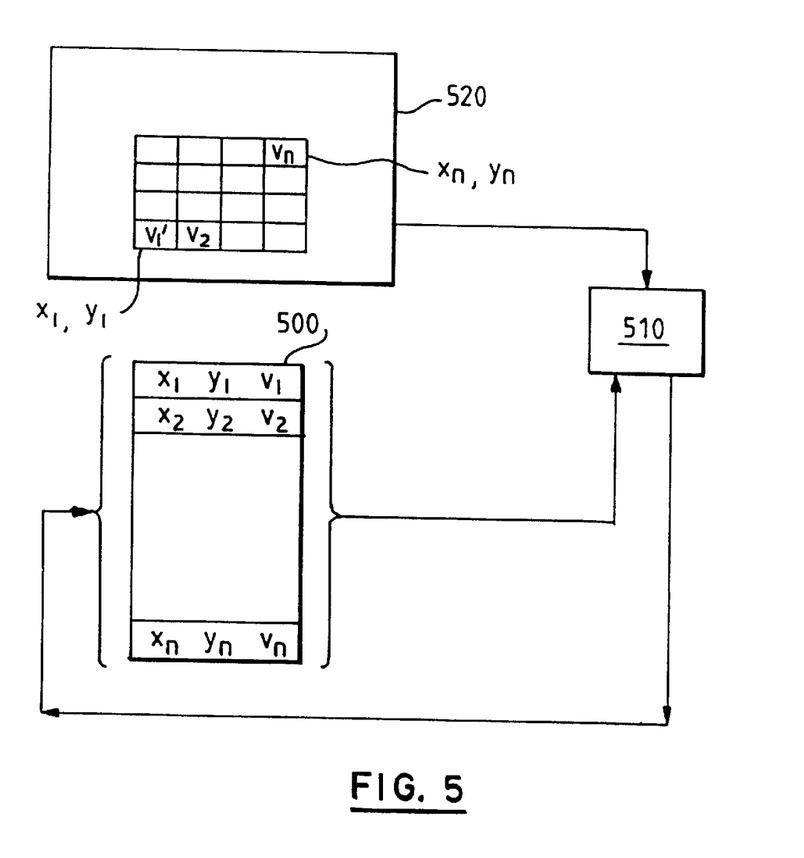
FIG. 5 illustrates a further embodiment in which a list further comprises for each location contained therein a respective value.

FIG. 5 illustrates a further embodiment in which a list 500 contains a value, $v_1, \ldots, v_n$, for each of the locations, $(x_1, y_1), \ldots, (x_n, y_n)$, stored therein. The values represent the pixel values of respective locations in the current image (not shown). By maintaining such values, $v_1, \ldots, v_n$, within the list 500, the current image can be discarded thereby reducing the amount of memory needed to realise an embodiment. A comparator 510 effects a comparison between the values, $v_1, \ldots, v_n$, stored in the list 510 and the pixels at corresponding locations, $(x_1, y_1), \ldots, (x_n, y_n)$, in a subsequent image 520.

For example, upon receiving a subsequent image 520, the value of the pixel at location $(x_1, y_1)$ therein is compared to the value $v_1$ stored in the list 500. If a difference therebetween exists, the location $(x_1, y_1)$ remains within the list 500 and the value, $v_1$, associated therewith is updated to reflect the value, $v'_1$ of the pixel at the location $(x_1, y_1)$ within the subsequent image 520. If a difference therebetween does not exist the location $(x_1, y_1)$ and respective value $v_1$ are removed from the list 500. The remaining locations $(x_2, y_2)$ et seq and respective values $v_2$ et seq are similarly processed until all locations within the list 500 have been considered.

Note that in this approach pixels values for neighbouring locations will not initially be available. Therefore, upon the selection of neighbouring locations, those locations assume the values of respective pixels in the subsequent image. Subsequent comparisons are effected using the recently acquired values.

Figure 6:
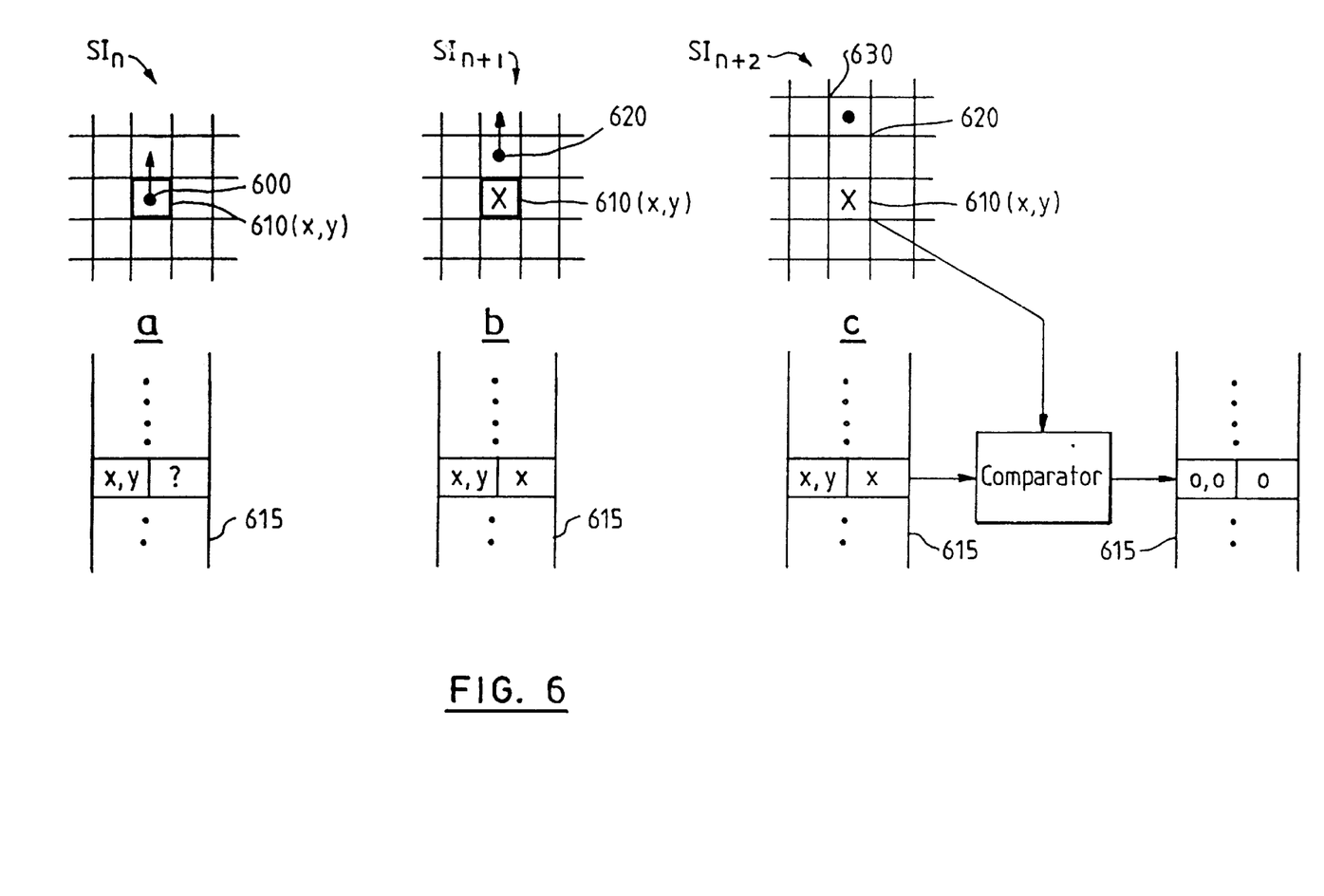
FIGS. 6a to 6c, illustrate delayed comparison of neighbouring locations.

Referring to FIGS. 6a to 6c, rather than acquiring the values of the neighbouring locations from a subsequent image, $SI_n$, an advantage can be realised if the acquisition of such values is delayed until the next subsequent image, $SI_{n+1}$, is received if the image is moving or has moved. The subsequent delay in comparing newly acquired neighbouring location values until the receipt of a new subsequent image, $SI_{n+2}$, has the advantage that, firstly, a comparison is not made immediately, which reduces immediate processing demands, and secondly, if the image is moving, the values of neighbouring locations as between successive subsequent images may be the same and the location can be discarded from the list thereby reducing the amount of data to output for further processing.

For example, if the location of a pixel as between successive subsequent images is changing due to image or camera movement the following sequence of events for any particular moving pixel can result. Referring to FIG. 6a, assume, in a subsequent image, $SI_n$, that the moving pixel 600 is at one of the neighbouring locations 610 and that neighbouring location is added to the list 615. In FIG. 6b the pixel value of the neighbouring location 610 is acquired when the next subsequent image, $SI_{n+1}$ is received; however, the pixel 600 has moved to a new location 620 and accordingly the value of neighbouring location is, for example, X, as opposed to the previous value of the pixel 600. The value, X, is added to the list 615. In FIG. 6c, the neighbouring location 610 and recently acquired value, X, are compared with the pixel value of the respective location 610 in the next subsequent image, $SI_{n+2}$. It can be seen that the values are identical and accordingly the neighbouring location 610 is removed from the list. In contrast, if acquisition of the value of the neighbouring location was concurrent with the acquisition of the neighbouring location itself, the following sequence of events would result. The value of the pixel 600 is added to the list. Upon receiving a subsequent image $SI_{n+1}$, the added value is compared to the pixel value, X, at the corresponding location 610 within the subsequent image $SI_{n+1}$. As the values are different the location thereof and the pixel value X in the subsequent image $SI_{n+1}$ will be output for further processing.

Therefore, the amount of data output for further processing is reduced as a consequence of delaying the acquisition of pixel values relative to the acquisition of neighbouring locations. Pixel movement as described above can occur when a trailing edge of a moving image is being processed.

Figure 7:
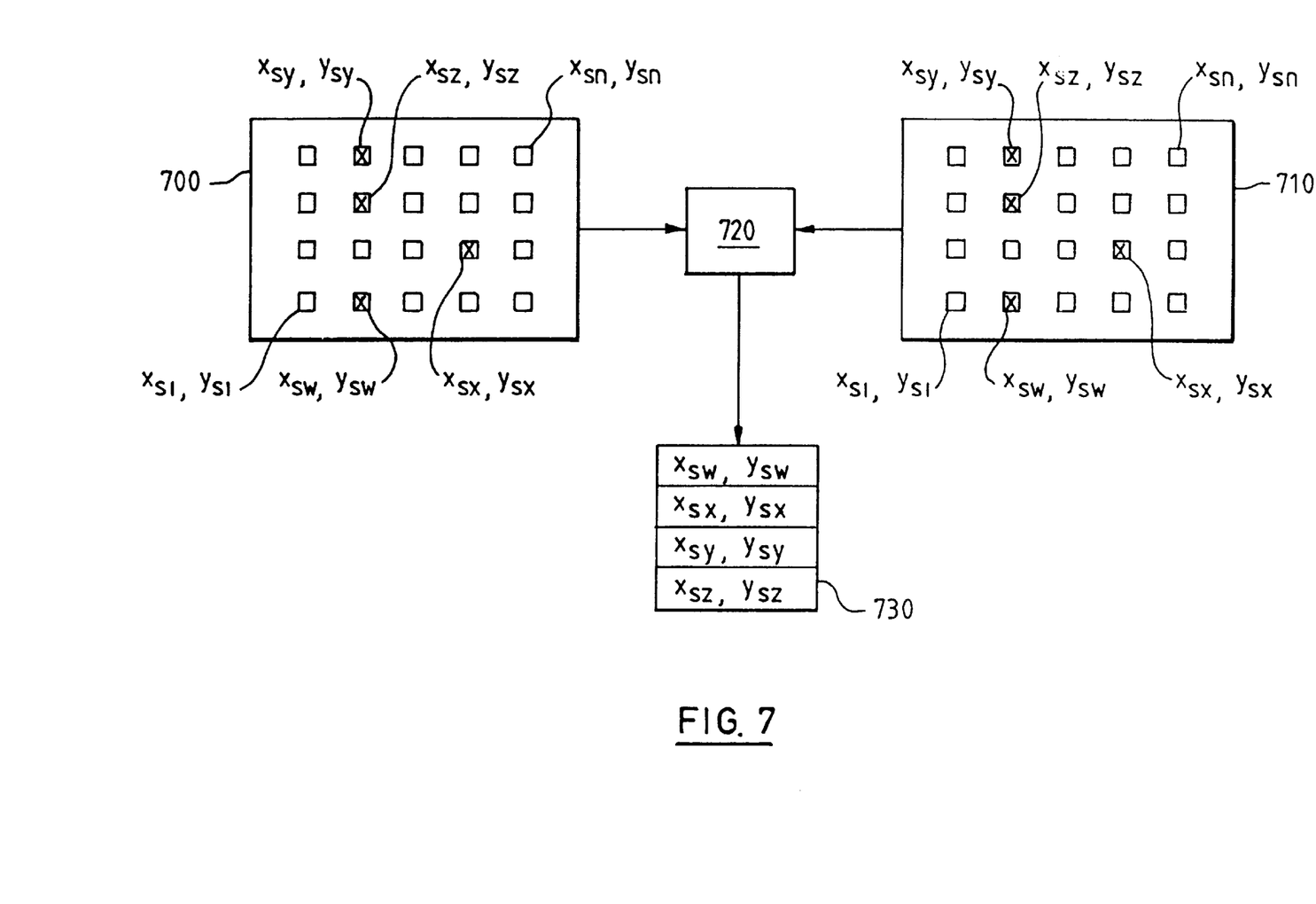
FIG. 7 illustrates coarse comparison of successive images.

In the above embodiments the comparisons concentrate on locations listed in the data structure. Consequently, differences between successive images not within or sufficiently proximate to those locations are overlooked. Therefore, preferably there is a coarse comparison effected between the current image and a subsequent image. Referring to FIG. 7, selected locations, $(x_{s1}, y_{s1}), \ldots, (x_{sn}, y_{sn})$, of a current image 700 and a subsequent image 710 are compared, via a comparator 720, to identify the locations of any differences therebetween. As per the above embodiments the locations, $(x_{sw}, y_{sw}), \ldots, (x_{sz}, y_{sz})$, of any such identified differences are added to the list 730 for future consideration (and is appropriate the associated values of the pixels).

The coarse comparison can be effected by comparing corresponding locations in current image 700 and the subsequent image 710, for example, every tenth pixel; both horizontally and vertically. Therefore, if the starting pixel for the first coarse comparison is pixel (0,0), the other pixels which are processed are (0+10,0), (0+20,0), ..., (0,0+10), (0,0+20) etc. The coarse comparison can vary so that different pixels are selected for comparison. For example, a different starting pixel for each coarse comparison can be selected. Generally, the locations of the pixels which are selected for comparison may, for the illustrated embodiment, be given by $$(s_x + m_x * n, s_y + m_y * m)$$

where $s_x$ is the starting ordinate of the first pixel of a comparison, $s_y$ is the starting abscissa of the first pixel of a comparison, $m_x$ is the step size of the ordinate of the pixel location, n is the nth step of the ordinate, $m_y$ is the step size of the abscissa of the pixel location, m is the mth step of the abscissa.

For a comparison m and n vary as follows. They both commence at zero, n is incremented by one up to a maximum which is determined by the number of pixels constituting a row of the image. When n reaches the maximum, it is reset to zero and m is incremented by one; m, as per n, is incremented up to a maximum determined by the number of rows of pixels supported by a particular display mode. Alternatively, the pixels selected as the basis for the coarse comparison can be made according to a statistical distribution or in any other desired manner such as selecting from one of a plurality of coarse location templates.

For a subsequent comparison, the starting ordinate and abscissa may vary. For example, each $s_x$ and $s_y$ can both be incremented by a predetermined value and the above process repeated. Further, such a coarse comparison can be instigated periodically. The period may be measured in terms of time or multiples of compared images or related to the number of locations currently stored within the list. Further, the step sizes m and n can be made to vary according to various criteria; such as the number of locations contained within the list. If the list is relatively empty, the step size can be reduced and visa versa.

As previously mentioned it is convenient to use the coarse comparison for initially populating the list. The locations identified by the coarse comparison effectively act as seed locations and the number of locations stored within the list will eventually increase providing neighbouring locations are also considered during subsequent comparisons.

Figure 8:
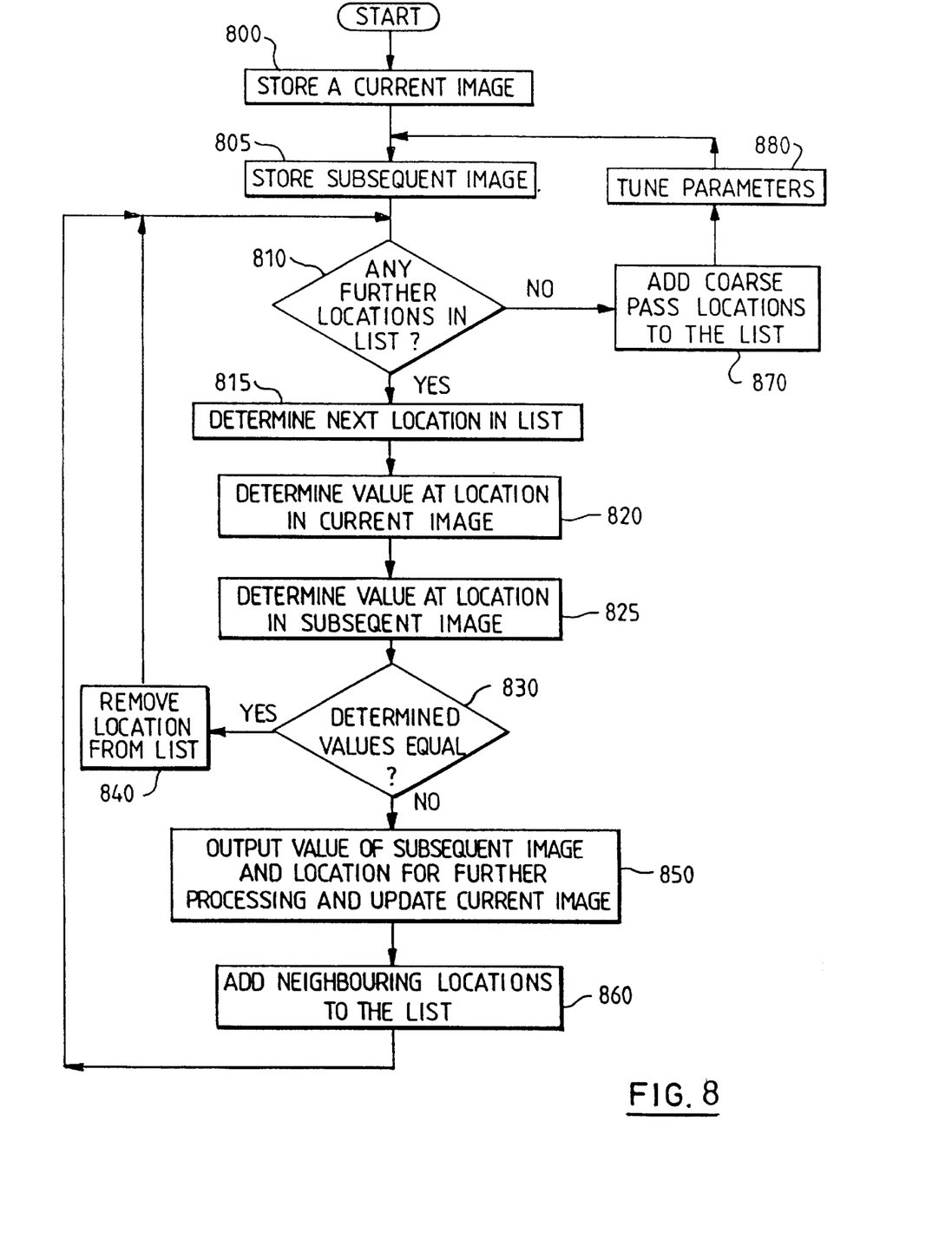
FIG. 8 illustrates a flow diagram of an embodiment.

Referring to FIG. 8, there is shown a flow diagram illustrating the steps of an embodiment. At step 800, the current image is stored. A subsequent image is received and stored at step 805. A determination as to whether or not there are any further locations with the list which need processing is made at step 810.

If the list does contain further locations to be processed, the next location in the list is determined at step 815. At steps 820 and 825 the pixel values within the current and subsequent images are determined at the location currently under consideration. The determined pixel values are compared at step 830. If they are identical, the location is removed from the list at step 840 and processing of the remaining locations within the list continues at step 810. If the pixel values are different, the pixel value of the subsequent image and the location thereof are output for further processing at step 850. The neighbouring locations of the location current location are determined and added to the list at step 860 and processing of the locations stored in the list continues at step 810.

If the list does not contain any further locations to be processed (typically when the first and second images are initially stored or after all the entries in the list have been processed), locations widely distributed over the images are calculated and added to the list at step 870 during a coarse pass over the images. A comparison involving these widely distributed locations will be effected when the next subsequent image is received and the next pass through the list is made. At step 880, parameters, such as contrast threshold, coarse pass resolution and neighbouring templates are altered according to, for example, the percentage utilisation of the list. This tuning helps to avoid overloading when the images are changing rapidly. The next subsequent image is received at step 805 and the above process is repeated.

There can be many variations on the detail of the above process. For example, although the above embodiment adds coarse pass locations to the list and effects comparisons using those locations between the current image and the next subsequent image, an embodiment can be realised in which the those locations are considered in comparisons effected between the images current being processed i.e. the current image and the subsequent image.

Similarly, the variation of step resolution or periodicity of the coarse scans according to utilisation of the list or the coarse scans can be effected either before or after all neighbouring locations currently in the list have been processed. Still further, the addition of neighbouring locations can be varied between, for example, adding neighbouring locations to the list after all location currently in the list have been processed and adding neighbouring locations immediately after each location has been processed.

Notwithstanding that the flow diagram outputs a pixel value and respective location at step 850, an alternative embodiment can be realised in which the pixel value is stored and all pixel values together with the locations currently in the list are output when all locations have been processed.

In all of the above embodiments, rather than comparing pixel values and determining if any difference exists, an embodiment can be realised in which a difference is deemed to exist only if that difference exceeds a threshold value. Using such a threshold value further reduces the number of pixels which have to be output for further processing in order to effect an update to an image and reduces the number of locations added to the list.

The comparisons in the above embodiments can be between indices to a colour palette having, for example, values between 0 and 255 which index RGB values or between actual RGB values or values derived therefrom.

Further, the threshold value can be made to vary typically as part of the tuning step. The variation of the threshold value may be related to the number of locations contained within the list. If the number of locations stored is low, i.e. the list is sparsely populated, the threshold value can be decreased so that more compared pixels are deemed to be sufficiently different to warrant inclusion in the list and output for further processing and vice versa.

Table 1 below illustrates simplified code for receiving a subsequent image. Corresponding pixels in the current image and subsequent images are compared, via a call to another function, DvComp( ), (not illustrated), and the locations of any differences are added to the list. The neighbouring locations are also determined and added to the list. A coarse pass or seek over the images is made to identify further locations to be added to the list.

The parameters of line 1 are as follows: "pbNew" is a pointer to the subsequent or newly acquired image, "pbBuffer" is a pointer to a buffer for holding the locations of any identified differences between the current image and an antecedent image of the subsequent image; "pulBQty" represents the number of updates added to the buffer.

Lines 2 to 17 constitute a while-loop. The while-loop steps through the locations contained in the list. The locations are accessed using a pointer thereto, pGist. A comparison is made between the pixel values of corresponding locations contained in the current image and a subsequent image. It can be seen from line 3 of the embodiment that the locations of a pixel is stored as an offset as opposed to a pair of Cartesian co-ordinates. The last storage location of the list is stored in "pgDvLast". A determination is made at line 3 as to whether or not the currently accessed storage location of the list is NULL. If so, lines 4 and 5 calculate the positions of corresponding pixels or locations in the current image and a subsequent image; pbDvOld and pbDvNew represent the position of the first pixels in the current and new images respectively. The pointers "pTOld" and "pTNew" are pointers to the locations under consideration in the current and subsequent images respectively. Line 6 is used to call a function, DvComp( ), which compares the pixel values and returns a code indicating whether or not the values are matched. The return codes are "DV_REMOVE" and "DV_UPDATE" which indicate that the pixels were matching or different respectively. The returned code is stored in variable "rc" of function "DvUpdate". The parameters of the function DvComp are pointers to pixels to be compared. Line 7 determines whether or not the return code is DV_UPDATE. If so, the output buffer is updated as follows. A check is made at line 8, to ensure that the output buffer has sufficient memory to hold any new location to be added thereto; pbLast stored the position of the last storage location of the output buffer. If sufficient memory is available, line 9 places the offset of the location into an output buffer at a position pointed to by "pbbuffer" and lines 10 to 11 copy the pixel value at the current location in the subsequent image into the current image and increment the buffer pointer, pbBuffer at line 12, in preparation for receiving the next image byte; "DV_BPPEL" represent the number bytes used to represent a pixel. At line 13, a call is made to function DVNebr( ) to check the neighbouring locations of the locations currently under consideration. The operation of this function is described below in table 2.

If the return code from function DvComp( ) is DV_REMOVE then the pixel values are matched and the corresponding location is removed from the list by calling function DvCutGist(pGist) at lines 14 and 15. The function DvCutGist( ) merely places a NULL value in the list at the position pointed to by pointer pGist.

Line 16 increments the pointer, pGist, to process the next location in the list.

The above is repeated until all locations contained within the list have been processed.

After all locations contained within the list have been processed, line 18 calls a function, DvSeek( ) which is described below is Table 3, to perform a coarse pass over the images to calculate the locations to be used in detecting further differences between the current image and the next subsequent image. Any such locations are added to the list.

TABLE 1

```
/***************************************************************\
 * Function: DVUpdate                                             *
 * Purpose: Differential Video scanning routine                   *
\***************************************************************/
1    uint32 DVUpdate( char POINTER pbNew, char POINTER pbBuffer,puint32
     pulBQty)
     {
     // Start at beginning of buffer of gists.
2    while ( pGist <= pgDvLast ) {
3      if ( *pGist != 0 ) { // pGist holds offset of site
4        pTOld = pbDvOld + *pGist; // Get image ptrs offset
5        pTNew = pbNew + *pGist;
6        rc = DvComp( pTOld, pTNew); // Do the comparison
7        if ( rc == DV_UPDATE ) {
           // Pel needs updating
8          if ( (puint32)pbBuffer <= pbLast ) { // Any buffer
                                                              left?
9            *((puint32)pbBuffer)++ = *pGist; // Put offset into
                                                              O/P buffer
10           for ( i = 0; i < DV_BPPEL; i++ ) { //Copy the
     new pel into buffer and old image
11             *pbBuffer = *(pTOld + i) = *(pTNew + i);
```

TABLE 1-continued

```
12              pbBuffer++; // Step ptr ready for next
            } /* endfor */
13          DvNebr( pGist); // Check neighbours
          } /* endif (pbBuffer) */
          //
14      } else if ( rc == DV_REMOVE ) {
          // Pel needs removing from the list
15          DvCutGist( pGist);
        } /* endif (rc) */
      } /* endif (pGist) */
16    pGist++; // Step up
17  } /* endwhile (count) */
    // Now coarse seek over image for new locations
18  DvSeek();
  }
  // End DVUpdate()
```

Table 2 below illustrates code for adding the locations of the neighbouring locations to the list. The function receives as a parameter the location in the list currently under consideration.

Lines 2 to 6 step through the arrays, aCx[ ] and yCy[ ], containing teh x and y co-ordinates respectively of the relative positions of neighbouring locations, adding the neighbouring locations to the list. The arrays aCx[ ] and yCy[ ] actually contain two templates each having eight locations. The template to be used during a comparison is determined by the value of "DvNTog". The function DvCalc( ) calculates the position within an image of a given neighbouring location. The call to function DvAddGist( ) adds the neighbouring location to the list if there if sufficient memory. If there is not sufficient memory, the return value of the function DvAddGist (see Table 4 below) is NULL the list is full and the processing of neighbouring locations is terminated.

TABLE 2

```
/****************************************************************\
* Function: DvNebr                                               *
* Purpose: Check the neighbouring pels for differences           *
\****************************************************************/
1  void DvNebr( puint32 pGist)
   {
2    for ( i = iDvNTogl; i < (iDvNTogl + 8); i++ ) {
3      n = DvCalc( *pGist, aCx[i], aCy[i]); // Calc offset of
                                               neighbour
4      if ( (pgNew = DvAddGist( n)) == NULL ) { // Add to list
5        break; // buffer full terminate function
       } /* endif */
     } /* endfor */
   }
   // End DvNebr()
```

Table 3 below illustrates code for performing a coarse pass or seek over the current image and a subsequent image. It can be seen that if the maximum number of locations which the list can hold is reached during the seek then the function is terminated. Variable n is used to hold the offset of the coarse pass locations. Variable ns is used to hold the start location, in terms of an offset, for the coarse comparison. The maximum number of coarse comparisons made in either the x or y directions are determined by the image size and the seek resolution, iDvRSeek, and are stored in maxX and maxY respectively; ssDvOX and ssDvOY represent the width and height of the images respectively. The variables stepX and stepY are used to hold the step size in the x and y directions for accessing the locations. A pointer, pgNew, is used to add to the list new locations identified during the seek operation. The variables iDvCreepx and iDvCreepY are used to vary the origin of the coarse scan. Lines 2 to 5 ensure that the creep values are less than the step width. Lines 6 and 7 determine the maximum number of seek locations in the horizontal and vertical directions respectively. The start position, ns, for the coarse comparison is calculated at line 8 in terms of the number of bytes from the first byte of the image. The step size for the coarse comparison in the x direction is calculated at line 9 in terms of a number of bytes by stepX=(seek resolution*number of bytes per location).

The step size for the coarse comparison in the y direction is calculated at line 10 in terms of a number of bytes by stepY=(seek resolution*image width*number of bytes per location).

Lines 11 to 20 constitute nested for-loops which add all locations calculated during the coarse pass to the list providing the latter has sufficient memory available to accommodate the coarse locations. Line 11 determines abscissa of the current row of pixels currently under consideration. Line 14 determines whether or not the newly calculated location, n, was added to the list. Note that a comparison at this stage does not take place. Tne comparison is delayed as discussed for the above embodiments until the next subsequent imageis received. If the determination at line 14 is such that a NULL value was returned by the function DvAddGist( ) then the list is full and operation of the function is terminated by lines 15, 17 and 18. If a location was successfully added to the list, the next location in the x direction is calculated at line 16. The above is repeated until either all locations of the coarse pass have been added to the list or the list is full.

TABLE 3

```
/*****************************************************************\
* Function: DVSeek                                                 *
* Purpose: To seek out new pels;                                   *
\*****************************************************************/
1   void DvSeek( void)
    {
    // Creep
    // Creep is diagonal, i.e. creeps X and Y are kept at equal values.
2       if ( (iDvCreepX += iDvRCreep) >= iDvRSeek ) {
3           iDvCreepX = 0; // Don't creep more than step width
        } /* endif */
4       if ( (iDvCreepY += iDvRCreep) >= iDvRSeek ) {
5           iDvCreepY = 0; // Don't creep more than step width
        } /* endif */
    // Seek
    // Calculate how many hits per row/col.
    // Number of dots is, for Width W, Step S & Offset O,
    // number = W/S + Add; where Add = ((Rem > 0) ? 1 : 0); where Rem //
    is the remainder from W/S.
6       maxX = (ssDvOX/iDvRSeek) + ((ssDvOX%iDvRSeek)>iDvCreepX?1:0);
7       maxY = (ssDvOY/iDvRSeek) + ((ssDvOY%iDvRSeek)>iDvCreepY?1:0);
8       ns = iDvCreepX+(iDvCreepY*ssDvOX))*DV_BPPEL; // Start position
9       stepX = iDvRSeek * DV_BPPEL; //x step factor
10      stepY = iDvRSeek * ssDvOX * DV_BPPEL; // y step factor
11      for ( i = 0; i < maxY; i++ ) { // Outer loop does Y stepping
12          n = ns + (i * stepY); // Step y down by the Seek resolution
13          for ( j = 0; j < maxX; j++ ) {
14              if ( (pgNew = DvAddGist( n)) == NULL ) {//Add new offset
                to list
15                  break; // Out of buffer - give up
                } /* endif */
16              n += stepX; // Step x along by the Seek resolution
            } /* endfor (i) */
17          if ( pgNew == NULL ) {
18              break; // Out of buffer - give up
19          } /* endif (pgNew) */
20      } /* endfor (j) */
21  }
    // End DvSeek()
```

Table 4 below illustrates the addition of a location to the list. Lines 2 and 3 define pointers used by the function. Line 4 pointer pGist to the first location in the list; which is stored using pGDvFirst. Lines 4 to 8 search through the list to determine the position of the first empty or null storage location which can accommodate a new location using a while loop and ensuring that the location proposed to be added to the list does not already form part of the list. The while-loop is terminated when either it is determined that the location currently under consideration is already part of the list or all locations in the list have been considered. Line 9 detemines whether the end of the list was reached; pgDvLast is used to identify the last data contained in the list. If the location is not already contained in the list and the list has sufficient capacity, the location is added to the list at the first empty or NULL storage position, the number of locations, ulDvGQty, stored in the list is updated accordingly and the location of the newly added location is returned. A NULL value is returned if the attempt to add the location to the list failed; otherwise the position of the locations within the list is returned.

TABLE 4

```
/*****************************************************************\
* Function: DvAddGist                                              *
* Purpose: Add gist to list. Don't add duplicates                  *
\*****************************************************************/
1   puint32 DvAddGist( uint32 n)
    {
2   puint32 pGist = NULL;
3   puint32 pNew = NULL;
4   pGist = pgDvFirst; // Start at beginning
5   while ( (pGist <= pgDvLast) && (*pGist != n) ) {
6       if ( (*pGist == 0) && (pNew == NULL) ) {
7           pNew = pGist; // Remember first empty
        } /* endif */
8       pGist++; // Step until duplicate or end
    } /* endwhile */
9   if ( pGist > pgDvLast ) { // If end, then no duplicate was found
10      if ( pNew != NULL ) {
11          *pNew = n; // Put new n into empty slot,
12          ulDvGQty++; // Inc count of gists
```

TABLE 4-continued

```
      } /* endif */
13    pGist = pNew; // Return gist, or null if no empties
      } /* endif */
14    return pGist; // Gist if dup or new, NULL if failed
   }
   // End DvAddGist()
```

What is claimed is:

1. A method for processing a sequence of digital images comprising a current image and a subsequent image, said method comprising the steps of:

creating a selective list of image locations, said list including only a portion of all possible image locations;

comparing the current digital image and the subsequent digital image only at the image locations in said list to identify any image locations in said list at which said current image and said subsequent image differ;

outputting the image locations in said list at which said current image and said subsequent image differ and corresponding values to update said current image; and updating said list in response to the image locations identified in said step of comparing by deleting image locations in said list at which said current image and said subsequent image do not differ and adding new image locations to said list.

2. A method as claimed in claim 1, further comprising the steps of:

selecting neighbouring image locations to the image locations contained within the list; and adding said neighbouring image locations to the list.

3. A method as claimed in claim 2, wherein neighbouring image locations are selected only for those image locations identified in said step of comparing.

4. A method as claimed in claim 2, wherein the step of selecting neighbouring image locations comprises selecting a different pattern of neighbouring image locations for different successive images.

5. A method as claimed in claim 1, further comprising the step of:

adding selectable image locations substantially uniformly distributed over said current and subsequent images to said list.

6. A method as claimed in claim 5, wherein the position of said selectable image locations are determined relative to a variable starting image location.

7. A method as claimed in claim 5, wherein the number of said selectable image locations varies according to the number of image locations in the list.

8. A method as claimed in claim 1, wherein said list further comprises for each image location therein a respective value representing the value of the image location of said current image, and wherein the step of comparing compares said respective values with values at corresponding image locations of said subsequent image to identify any differences therebetween.

9. A method as claimed in claim 1, wherein the step of comparing uses a threshold value such that any differences less than said threshold value are ignored.

10. A method as claimed in claim 9, wherein the threshold value is variable according to the number of image locations in the list.

11. A system for processing a sequence of digital images comprising a current image and a subsequent image, said system comprising:

means for creating a selective list of image locations, said list including only a portion of all possible image locations;

means for comparing the current digital image and the subsequent digital image only at the image locations in said list to identify any image locations at which said current image and said subsequent image differ;

means for outputting the image locations in said list at which said current image and said subsequent image differ and corresponding values to update said current image; and means for updating said list in response to the image locations identified in said comparing means by deleting image locations in said list at which said current image and said subsequent image do not differ and adding new image locations to said list.

* * * * *